United States Patent
Ashraf et al.

(10) Patent No.: US 10,769,574 B2
(45) Date of Patent: Sep. 8, 2020

(54) MAXIMIZE HUMAN RESOURCES EFFICIENCY BY REDUCING DISTRACTIONS DURING HIGH PRODUCTIVITY PERIODS

(71) Applicant: INTERNATIONAL BUSINESS MACHINES CORPORATION, Armonk, NY (US)

(72) Inventors: Uwais Ashraf, Chandler's Ford (GB); Ioannis Georgiou, Eastleigh (GB); James Hook, Eastleigh (GB); Craig J. Morten, Woking (GB)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 15/823,694

(22) Filed: Nov. 28, 2017

(65) Prior Publication Data

US 2019/0164103 A1    May 30, 2019

(51) Int. Cl.
*G06Q 10/06* (2012.01)
*G06Q 10/10* (2012.01)

(52) U.S. Cl.
CPC . *G06Q 10/06395* (2013.01); *G06Q 10/06393* (2013.01); *G06Q 10/063114* (2013.01); *G06Q 10/1095* (2013.01); *G06Q 10/1097* (2013.01)

(58) Field of Classification Search
CPC .......................................... G06Q 10/00–50/00
USPC ............................................. 705/7.11–7.42
See application file for complete search history.

(56) References Cited

U.S. PATENT DOCUMENTS

| | | | |
|---|---|---|---|
| 6,675,130 B2 * | 1/2004 | Kanevsky | G06Q 10/06 702/188 |
| 7,881,990 B2 * | 2/2011 | Slattery | G06F 11/3419 235/377 |
| 8,548,843 B2 * | 10/2013 | Folk | G06Q 10/06 705/7.42 |
| 8,651,871 B2 * | 2/2014 | Morais | G09B 7/02 434/219 |
| 8,872,640 B2 * | 10/2014 | Horseman | A61B 5/18 340/425.5 |
| 9,111,263 B2 | 8/2015 | Li et al. | |

(Continued)

OTHER PUBLICATIONS

Alba, "The AI Bot That Scans Your Email and Automatically Schedules Meetings", WIRED.com, http://www.wired.com/2015/01/virtual-email-assistant/, Jan. 12, 2015, pp. 1-8.

(Continued)

*Primary Examiner* — Alan S Miller
(74) *Attorney, Agent, or Firm* — Michael O'Keefe

(57) ABSTRACT

A method, computer system, and computer program product for reducing one or more distractions during a period of high productivity are provided. The embodiment may include receiving a plurality of user metadata. The embodiment may also include, in response to determining a user is in a high productivity state, analyzing the plurality of received user metadata for potential distractions to the high productivity state. The embodiment may further include, in response to identifying one or more potential distractions based on the plurality of analyzed user metadata, determining an appropriate modification to the one or more identified potential distractions. The embodiment may also include performing the determined appropriate modification.

17 Claims, 5 Drawing Sheets

(56) References Cited

U.S. PATENT DOCUMENTS

| | | | | |
|---|---|---|---|---|
| 9,262,748 | B2* | 2/2016 | Kozloski | G06Q 10/10 |
| 9,295,414 | B1* | 3/2016 | Chander | A61B 5/1118 |
| 9,492,120 | B2* | 11/2016 | Horseman | G06F 19/3418 |
| 9,693,734 | B2* | 7/2017 | Horseman | G06F 19/3418 |
| 9,710,788 | B2* | 7/2017 | Horseman | A61B 5/0476 |
| 9,781,494 | B1* | 10/2017 | Barakat | H04Q 9/00 |
| 9,808,156 | B2* | 11/2017 | Horseman | A61B 5/6887 |
| 9,830,576 | B2* | 11/2017 | Horseman | G16H 40/67 |
| 9,830,577 | B2* | 11/2017 | Horseman | G16H 50/30 |
| 9,844,344 | B2* | 12/2017 | Horseman | G06F 19/3418 |
| 9,949,640 | B2* | 4/2018 | Horseman | A61B 5/6887 |
| 9,962,083 | B2* | 5/2018 | Horseman | A61B 5/6887 |
| 10,052,023 | B2* | 8/2018 | Horseman | A61B 5/6887 |
| 10,058,285 | B2* | 8/2018 | Horseman | A61B 5/4872 |
| 10,206,625 | B2* | 2/2019 | Horseman | G06F 19/3418 |
| 2002/0038235 | A1* | 3/2002 | Musafia | G06Q 10/10 705/7.25 |
| 2002/0082809 | A1* | 6/2002 | Kanevsky | G06Q 10/06 702/188 |
| 2004/0225397 | A1* | 11/2004 | Gotfried | G06Q 10/06398 700/111 |
| 2006/0282191 | A1* | 12/2006 | Gotfried | G06Q 10/06398 700/111 |
| 2009/0098518 | A1* | 4/2009 | Morais | G09B 7/02 434/236 |
| 2010/0023385 | A1* | 1/2010 | Galvan | G06Q 10/06 705/7.42 |
| 2010/0121686 | A1* | 5/2010 | Mahadevan | G06Q 10/06393 705/7.39 |
| 2010/0179993 | A1* | 7/2010 | Beynon | G06Q 10/107 709/206 |
| 2010/0250343 | A1 | 9/2010 | Lamoncha | |
| 2011/0035247 | A1* | 2/2011 | Perry | G06Q 10/087 705/7.38 |
| 2011/0320235 | A1 | 12/2011 | Bak et al. | |
| 2012/0310696 | A1* | 12/2012 | Toth | G06Q 10/0639 705/7.21 |
| 2013/0009761 | A1* | 1/2013 | Horseman | A61B 5/1114 340/425.5 |
| 2013/0012786 | A1* | 1/2013 | Horseman | G16H 40/63 600/301 |
| 2013/0012787 | A1* | 1/2013 | Horseman | A61B 5/1113 600/301 |
| 2013/0012788 | A1* | 1/2013 | Horseman | G06F 19/3418 600/301 |
| 2013/0012789 | A1* | 1/2013 | Horseman | A61B 5/02055 600/301 |
| 2013/0013327 | A1* | 1/2013 | Horseman | A61B 5/01 705/1.1 |
| 2013/0110590 | A1* | 5/2013 | Folk | G06Q 10/06 705/7.42 |
| 2013/0275187 | A1* | 10/2013 | Patel | G06Q 10/06398 705/7.42 |
| 2014/0019165 | A1* | 1/2014 | Horseman | G06Q 10/105 705/3 |
| 2014/0025396 | A1* | 1/2014 | Horseman | G16H 50/30 705/2 |
| 2014/0025397 | A1* | 1/2014 | Horseman | G16H 40/20 705/2 |
| 2014/0058801 | A1* | 2/2014 | Deodhar | G06Q 10/0639 705/7.38 |
| 2014/0163330 | A1* | 6/2014 | Horseman | A61B 5/4872 600/301 |
| 2014/0163331 | A1* | 6/2014 | Horseman | G16H 15/00 600/301 |
| 2014/0163332 | A1* | 6/2014 | Horseman | A61B 5/01 600/301 |
| 2014/0163333 | A1* | 6/2014 | Horseman | A61B 5/72 600/301 |
| 2014/0163336 | A1* | 6/2014 | Horseman | A61B 5/6891 600/301 |
| 2014/0163337 | A1* | 6/2014 | Horseman | A61B 5/021 600/301 |
| 2014/0278638 | A1* | 9/2014 | Kreuzkamp | G06Q 10/06398 705/7.15 |
| 2014/0358614 | A1 | 12/2014 | Grover et al. | |
| 2014/0372162 | A1 | 12/2014 | Dhara et al. | |
| 2015/0006221 | A1 | 1/2015 | Mermelstein et al. | |
| 2015/0012186 | A1* | 1/2015 | Horseman | A61B 5/1114 701/49 |
| 2015/0269512 | A1* | 9/2015 | Wartel | G06Q 10/06393 705/7.39 |
| 2015/0363733 | A1* | 12/2015 | Brown | G06Q 10/10 705/7.26 |
| 2016/0260044 | A1* | 9/2016 | Sabet | G06Q 10/06398 |
| 2016/0371645 | A1 | 12/2016 | Serjeantson et al. | |
| 2017/0034726 | A1* | 2/2017 | Broomhall | H04M 3/42374 |
| 2017/0046642 | A1 | 2/2017 | Bishop et al. | |
| 2019/0043018 | A1* | 2/2019 | Hailpern | G06Q 10/1093 |
| 2019/0090816 | A1* | 3/2019 | Horseman | A61B 5/7275 |
| 2019/0122036 | A1* | 4/2019 | Ward | G06K 9/00342 |

OTHER PUBLICATIONS

Anonymous, "Method and System for Scheduling Meetings Based on Calendar Schedule of Participants", An IP.com Prior Art Database Technical Disclosure, IP.com No. IPCOM000231130D, IP.com Electronic Publication Date: Sep. 30, 2013, https://priorart.ip.com/IPCOM/000231130, pp. 1-3.

Anonymous, "Flexible Calendar Scheduling System", An IP.com Prior Art Database Technical Disclosure, Original Publication Date: Dec. 21, 2009, IP.com No. IPCOM000191209D, https://priorart.ip.com/IPCOM/000191209, pp. 1-4.

Anonymous, "Proactive Schedule Management", An IP.com Prior Art Database Technical Disclosure, Original Publication Date: Sep. 22, 2009, IP.com No. IPCOM000188060D, https://priorart.ip.com/IPCOM/000188060, pp. 1-3.

Mell et al., "The NIST Definition of Cloud Computing," U.S. Department of Commerce, National Institute of Standards and Technology, Sep. 2011, p. 1-7, Special Publication 800-145.

Barker et al., U.S. Appl. No. 15/224,759, filed Aug. 1, 2016, titled "Calendar Management for Recommending Availability of an Invitee", pp. 1-50.

Activtrak, "Productivity Monitoring Software", Activtrak.com, http://activtrak.com/productivity-monitoring/, printed on Jul. 7, 2017, copyright 2017, Birch Grove Software, Inc., pp. 1-2.

Android Developers, "Notification Manager", https://developer.android.com/reference/android/app/NotificationManager.html, printed on Jul. 7, 2017, pp. 1-15.

Casey, "How to Disable App Notifications in Windows 10", Laptopmag.com, https://www.laptopmag.com/articles/disable-app-notifications-windows-10, Mar. 10, 2016, pp. 1-6.

Lee, "The Science of Motivation: Your Brain on Dopamine", I Done This Blog, The Science of Small Wins, The Science of Productivity, http://blog.idonethis.com/the-science-of-motivation-your-brain-on-dopamine/, Jan. 24, 2017, pp. 1-6.

Mental Health Daily, "5 Types of Brain Waves Frequencies: Gamma, Beta, Alpha, Theta, Delta", Mental Health Blog, http://mentalhealthdaily.com/2014/04/15/5-types-of-brain-waves-frequencies-gamma-beta-alpha-theta-delta/, Apr. 15, 2014, pp. 1-16.

Nguyen, "Hacking Into Your Happy Chemicals: Dopamine, Serotonin, Endorphins and Oxytocin", Huffington Post, The Blog, https://www.huffingtonpost.com/thai-nguyen/hacking-into-your-happy-c_b_6007660.html, Oct. 20, 2014, pp. 1-3.

Rescuetime, "Get RescueTime Premium and take your productivity to the next level", https://www.rescuetime.com/rescuetime-pro, printed on Jul. 7, 2017, pp. 1-2.

Scott, "Computer trained to detect micro-expressions better than humans", WIRED.com, http://www.wired.co.uk/article/computer-trained-to-read-micro-expressions, Nov. 23, 2011, pp. 1-3.

Sieber, "5 Distracting Desktop Notifications & How to Turn Them Off [Windows]", MakeUseOf, http://www.makeuseof.com/tag/5-distracting-desktop-notifications-turn-...3, printed on Jul. 7, 2017, pp. 1-3.

(56) References Cited

OTHER PUBLICATIONS

Smith, "How Augmented Reality and Virtual Reality Can Boost Your Workplace Productivity in 5 Simple Ways", Business 2 Community, Tech & Gadgets, https://www.business2community.com/tech-gadgets/augmented-reality-virtual-reality-can-boost-workplace-productivity-5-simple-ways-01786036, Mar. 16, 2017, pp. 1-5.

Timedoctor, "Time Doctor Features for Teams", https://www.timedoctor.com/features.html, printed on Jul. 7, 2017, pp. 1-10.

C., Tony, "Wearables are Revolutionizing Productivity with Technology", https://for-managers.com/wearables-revolutionizing-productivity/, printed on Jul. 7, 2017, pp. 1-5.

Transfusion Media, "StayFocusd", Google Chrome Web Store, https://chrome.google.com/webstore/detail/stayfocusd/laankejkbhbdhmipfmgcngdelahlfoji?hl=en, printed on Jul. 7, 2017, 1 page.

Wikipedia, "Lint (software)", https://en.wikipedia.org/wiki/Lint, printed on Jul. 7, 2017, pp. 1-2.

* cited by examiner

MAXIMIZE HUMAN RESOURCES EFFICIENCY BY REDUCING DISTRACTIONS DURING HIGH PRODUCTIVITY PERIODS

BACKGROUND

The present invention relates, generally, to the field of computing, and more particularly to user notifications.

Notifications may relate to messages transmitted and/or displayed to a user that alerts the user to an item. For example, if a user receives a text message on a mobile device, a notification may be displayed on the home screen of the mobile device to alert the user of the received text message. A notification system may be software and hardware that has the capability of delivering a message to a recipient from a sender. Notification systems may be interrelated with other systems to provide additional capabilities to unrelated entities. For example, a calendar program may have notification system capabilities that allow a notification to be sent to a user when a calendar event is upcoming.

SUMMARY

According to one embodiment, a method, computer system, and computer program product for reducing one or more distractions during a period of high productivity are provided. The embodiment may include receiving a plurality of user metadata. The embodiment may also include, in response to determining a user is in a high productivity state, analyzing the plurality of received user metadata for potential distractions to the high productivity state. The embodiment may further include, in response to identifying one or more potential distractions based on the plurality of analyzed user metadata, determining an appropriate modification to the one or more identified potential distractions. The embodiment may also include performing the determined appropriate modification.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
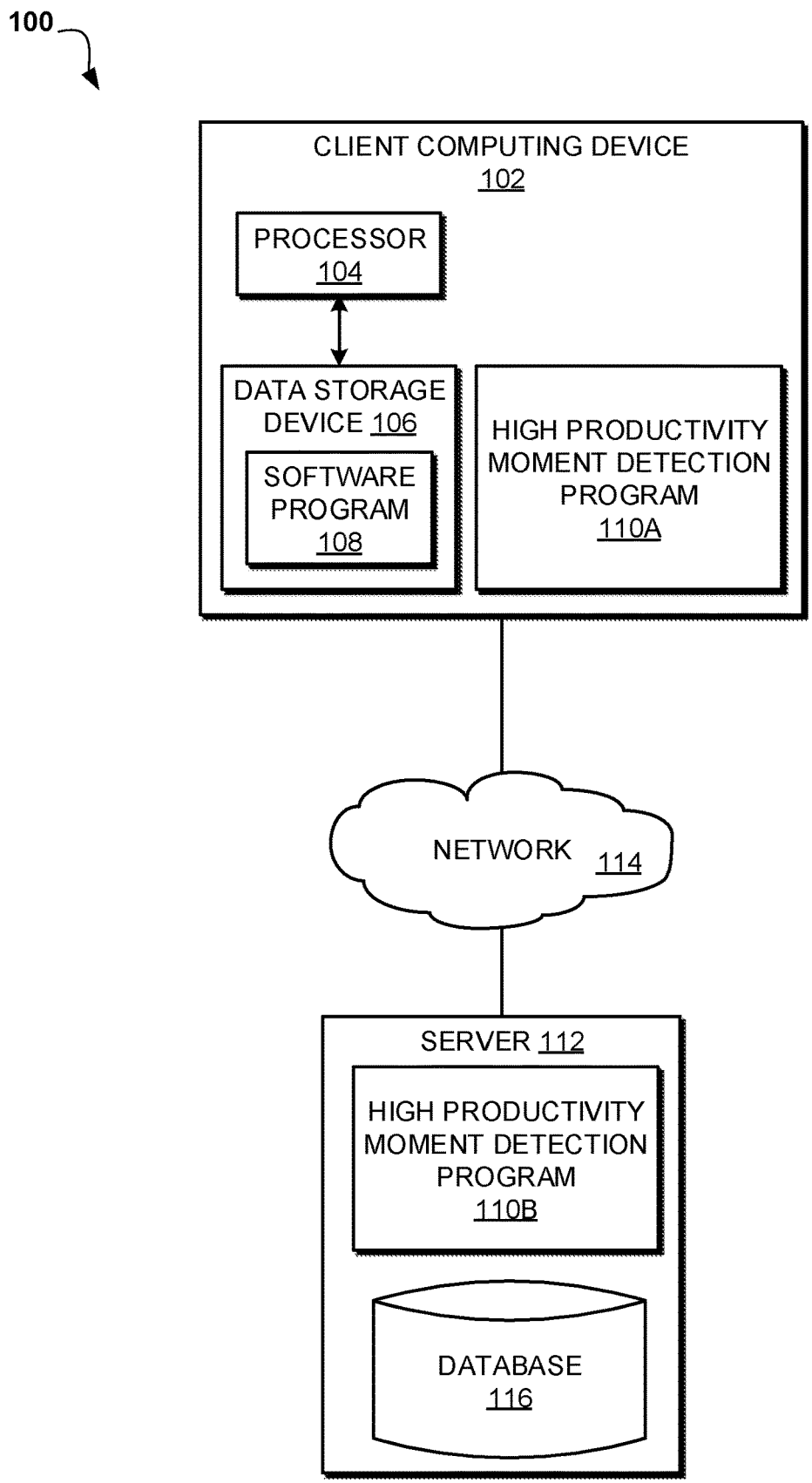
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to user notifications. The following described exemplary embodiments provide a system, method, and program product to, among other things, detect moments of high user productivity and implement steps to protect the user's attention from distractions. Therefore, the present embodiment has the capacity to improve the technical field of user notifications by automatically delaying the transmission of notifications or altering a user's schedule based on detecting the user being in a high productivity state.

As previously described, notifications may relate to messages transmitted and/or displayed to a user that alerts the user to an item. For example, if a user receives a text message on a mobile device, a notification may be displayed on the home screen of the mobile device to alert the user of the received text message. A notification system may be software and hardware that has the capability of delivering a message to a recipient from a sender. Notification systems may be interrelated with other systems to provide additional capabilities to unrelated entities. For example, a calendar program may have notification system capabilities that allow a notification to be sent to a user when a calendar event is upcoming.

When working, any distractions or interruptions, such as interrupting individuals, pop-up messages, or meetings, can result in a loss in train of thought and a disrupted mindset thereby yielding suboptimal working performance and individual efficiency. Only by reducing potential distractions can individuals achieve consistent periods of high productivity. As such, it may be advantageous to, among other things, implement a solution to maximize an individual's performance during period of high productivity by ensuring distractions are minimized.

According to one embodiment, user metadata produced by computers and smart devices used by an individual while performing job-related tasks may be monitored to determine instances when a user is highly productive. Additionally, calendar details, persistent chat conversations on various applications, such as Slack® (Slack and all Slack-based trademarks and logos are trademarks or registered trademarks of Slack Technologies and/or its affiliates) and Mural® (Mural and all Mural-based trademarks and logos are trademarks or registered trademarks of Tactivos, Inc. and/or its affiliates), web search history, and personal notes may be analyzed using various criteria to classify a user's focus and performance level. The classification metrics may be defined using the user's most productive and unproductive moments rather than productivity-related information of colleagues or competitors. The user metadata may also be monitored for potential distractions to the user's productivity and any distractions may be rated based on usefulness or importance to the user as well as by the amount of distraction provided to the user. Then, based on the metrics, a suitable filtering/modification of any identified distractions may occur to ensure maximum user productivity is maintained.

For example, if an employee has recently joined a software company and is learning a new software coding language with which the employee struggles, ensuring the employee maintains focus while learning the new coding language is imperative. In a situation where the employee has made a breakthrough in learning the language and has subsequently written a number of lines of code that successfully pass several tests, allowing the employee to remain focused may be extremely beneficial to the employee's productivity in completing job tasks and establishing a solid foundation for the coding language. However, the employee may have an upcoming meeting with a coworker to which the employee is about to receive a notification. Upon analyzing metadata surrounding the meeting, it may be determined that the meeting may be rescheduled since all participants have open schedules later in the day, the meeting room is available when the participants are available, and the topic of the meeting is not of high importance. Therefore, rather than producing a pop-up notification and posing a risk to the employee's high productivity, an automated message may be sent to the scheduled meeting participants requesting that the meeting be rescheduled since the employee is in a period of high productivity.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to analyze user metadata to determine instances where an individual is presently in a period of high productivity and acting accordingly to ensure the user maintains high productivity until a distraction necessitated by the analyzed user metadata.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a high productivity moment detection program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302 and external components 304, respectively.

The server computer 112 may be a laptop computer, netbook computer, personal computer (PC), a desktop computer, or any programmable electronic device or any network of programmable electronic devices capable of hosting and running a high productivity moment detection program 110B and a database 116 and communicating with the client computing device 102 via the communication network 114, in accordance with embodiments of the invention. As will be discussed with reference to FIG. 3, the server computer 112 may include internal components 302 and external components 304, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the high productivity moment detection program 110A, 110B may be a program capable of receiving and analyzing metadata to identify periods of high user productivity, and modify notifications and events accordingly and appropriately so ensure high productivity is maintained. The high productivity moment detection method is explained in further detail below with respect to FIG. 2.

Figure 2:
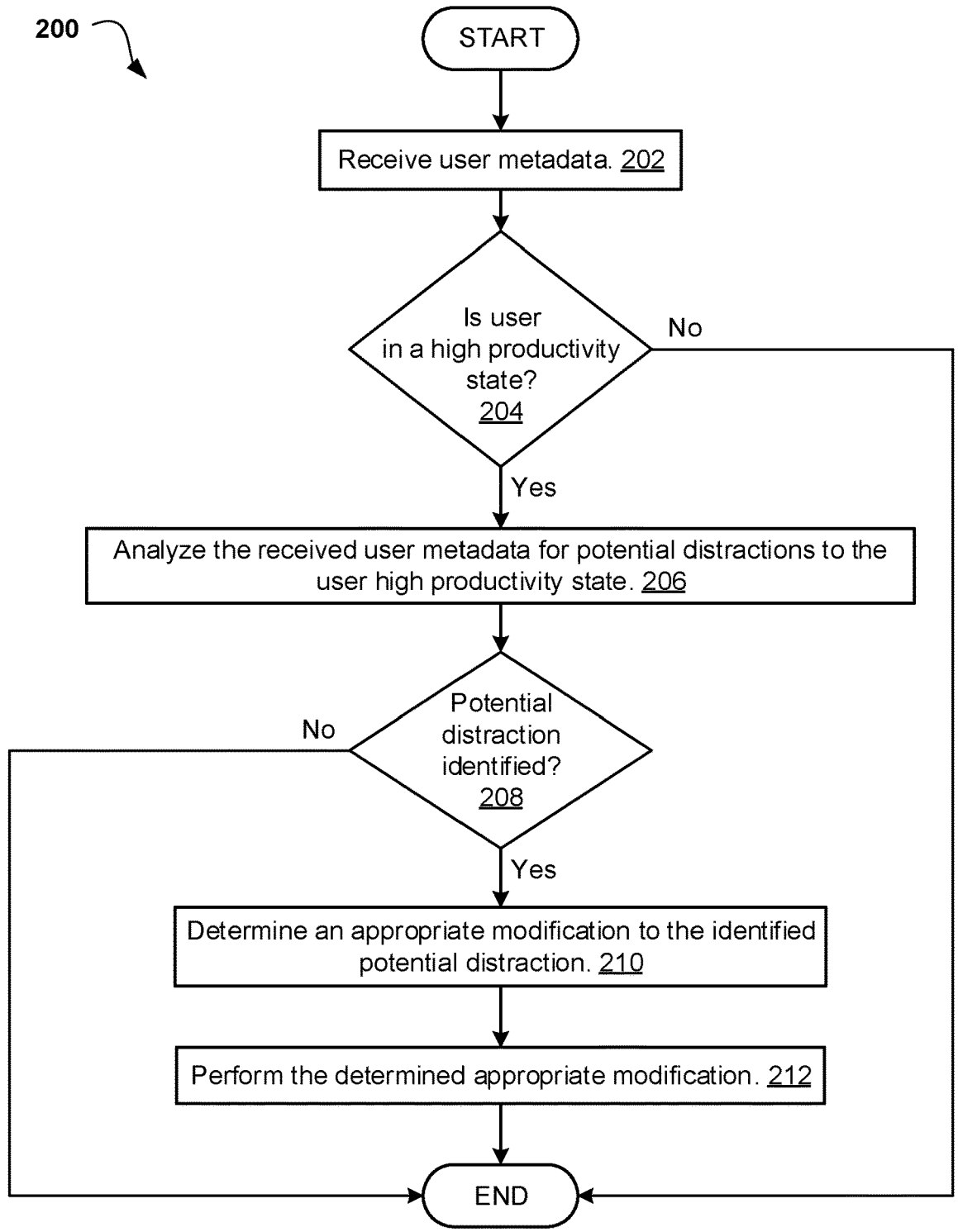
FIG. 2 is an operational flowchart illustrating a high productivity moment detection process according to at least one embodiment.

FIG. 2 is an operational flowchart illustrating a high productivity moment detection process 200 according to at least one embodiment. At 202, the high productivity moment detection program 110A, 110B receives user metadata. In order to properly determine when a user is in a high productivity state and when potential distractions are upcoming, the high productivity moment detection program 110A, 110B may receive or capture user metadata. The user metadata may be information captured by a computer, such as client computing device 102, capable of accessing information via a network 114 or capturing information directly from a user, such as biometric data captured by wearable technology. The user metadata may include a current open software application, successful completion of scheduled tasks, calendar details, chat history, user typing speed, heart rate, perspiration level, blood pressure, facial expression, pupil dilation, user focus direction, and hand movements.

In at least one embodiment, the high productivity moment detection program 110A, 110B may calculate a baseline for the user when an initial batch of user metadata is received. The baseline may be used by the high productivity moment detection program 110A, 110B to determine when the user is in a high productivity state through a comparison of the received user metadata with the baseline.

Then, at 204, the high productivity moment detection program 110A, 110B determines if the user is in a high productivity state. According to one implementation, the high productivity moment detection process 200 may continue if the user is in a high productivity state. The high productivity moment detection program 110A, 110B may determine when the user is in a high productivity state by calculating a productivity score that is relative to the user's personal baseline using a weighted sum of concentration measures. The concentration measures may assign positive scores to items that indicate higher than average productivity. For example, in the field of software development, items of high productivity may include well written source code identified through code analysis tools, functional and sample tests for new code are successful, and recent window focus data (e.g., the user spending large amounts of time with a window of an integrated development environment active). Conversely, items of low productivity may include negative scores to items that indicate lower than average productivity (e.g., short breakthroughs in work separated by long periods of little contribution), quantity of lines of code produced, consistency rate of work produced, historical productivity data, historical schedule data, hormonal physiological effects, brain physiological effects, recent device focus data, track micro/macro-expressions, general health data, and current noise levels. In at least one embodiment, the high productivity moment detection program 110A, 110B may have other considerations when determining a user's productivity score, such as physiological factors, environmental factors, and behavioral factors. If high productivity moment detection program 110A, 110B determines user is in a high productivity state (step 204, "Yes" branch), the high productivity moment detection process 200 may continue to step 206 to analyze the received user metadata for potential distractions to the user high productivity state. If the high productivity moment detection program 110A, 110B determines the user is not in a high productivity state (step 204, "No" branch), the high productivity moment detection process 200 may terminate.

Next, at 206, the high productivity moment detection program 110A, 110B analyzes the received user metadata for potential distractions to the user high productivity state. The high productivity moment detection program 110A, 110B may be able to identify various distractions to the user's high productivity state based on the received user metadata. For example, a computing device's notification system may be monitored for incoming notifications/applications attached to the notification system that may be a potential distraction. Similarly, the high productivity moment detection program 110A, 110B may monitor currently executing programs/applications/services with the capacity to produce pop-up windows that can be potentially distracting to the user. Additionally, application volume settings may be monitored for notifications and alerts. Furthermore, the high productivity moment detection program 110A, 110B may be capable of tracking the number of display screens to determine a specific display screen a notification (e.g., a pop-up window) may appear on in relation to the user's current focus.

Then, at 208, the high productivity moment detection program 110A, 110B determines if a potential distraction is identified in the analyzed user metadata. According to one implementation, the high productivity moment detection process 200 may continue if a potential distraction is identified in the analyzed user metadata. If high productivity moment detection program 110A, 110B identifies a potential distraction (step 208, "Yes" branch), the high productivity moment detection process 200 may continue to step 210 to determine an appropriate modification to the identified potential distraction. If the high productivity moment detection program 110A, 110B does not identify a potential distraction (step 208, "No" branch), the high productivity moment detection process 200 may terminate.

Next, at 210, the high productivity moment detection program 110A, 110B determines an appropriate modification to the identified potential distraction. The high productivity moment detection program 110A, 110B may respond differently to a potential distraction depending on a ratio of how useful the distraction may be to how distractive the distraction may be. Each identified potential distraction may be ranked in terms of priority as well as the impact on user concentration if the distraction is permitted to occur. Various ratings for how distractive an item may be may include a high rating for a pop-up message in the middle of a display screen, a medium rating for notifications in a corner of the display screen or a loud noise playing through speakers, and a low rating for a quiet notification noise playing through speakers. Various ratings for how useful an item may be may include high for an instant messenger chat window initiated by the user rather than another chat participant or a pop-up window that includes keywords relevant to the user's current work and a low rating for a notification of an upcoming meeting to which the user's attendance is optional. By weighing how distractive an item may be versus an item's usefulness, the high productivity moment detection program 110A, 110B may be capable of graphing a distraction element within a sector of a 2-dimensional distractiveness vs. usefulness plane where each section of the plane may be color coded to indicate instances when specific modifications may be performed for a distraction element. For example, if a plane is divided into red, orange, and green sectors to indicate highly distracting, moderately distracting, and mildly distracting sectors, the high productivity moment detection program 110A, 110B may determine distraction elements graphed in red sectors should be filtered out and not presented to the user, distraction elements graphed in orange sectors should be modified to be less impactful on the user, and distraction elements graphed in green sectors should not be modified and allow corresponding notifications be transmitted to the user normally.

In at least one embodiment, modifications for moderately distracting notification (e.g., items graphed to an orange sector in the preceding example) may include reducing the volume of a sound notification, shifting a notification/window to the side, and selecting useful information from a message/email and only displaying the selected information. Modifications for highly distracting notifications (e.g., items graphed to a red sector in the preceding example) may include preventing a noise/pop-up/notification from executing until a later time, automatically setting a user status to away, and rescheduling a meeting for a later date and/or time.

Then, at 212, the high productivity moment detection program 110A, 110B performs the determined appropriate modification. Once the high productivity moment detection program 110A, 110B determines the appropriate modification to perform, the high productivity moment detection program 110A, 110B may execute the modification. For example, if the appropriate modification is to disable a pop-up notification for an upcoming meeting to which the user's attendance is optional, the high productivity moment detection program 110A, 110B may alter the settings of the meeting notification to disable the display of the meeting reminder to the user.

It may be appreciated that FIG. 2 provides only an illustration of one implementation and does not imply any limitations with regard to how different embodiments may be implemented. Many modifications to the depicted environments may be made based on design and implementation requirements. For example, at times when a distraction arises, the high productivity moment detection program 110A, 110B may silence notifications, emails, pop-ups, and hide/dim windows that are unrelated to the task being completed by the user. Additionally, the high productivity moment detection program 110A, 110B may divert incoming phone calls, reschedule meetings, change calendar bookings and settings, and cancel or extend room bookings accordingly.

In at least one other embodiment, at time of low user concentration, the high productivity moment detection program 110A, 110B can produce alerts or prompts to help the user focus. For example, if user's distraction is caused by browsing the internet, the high productivity moment detection program 110A, 110B may highlight or bring work-related windows to the foreground. Additionally, by retrieving calendar data, the high productivity moment detection program 110A, 110B may incentivize the user to be more productive by reminding the user of an imminent deadline or a recent success. For example, the high productivity moment detection program 110A, 110B may display the phrase "Last Tuesday, you contributed 100 lines of bug free code, breaking your previous personal best of 86 lines!"

Figure 3:
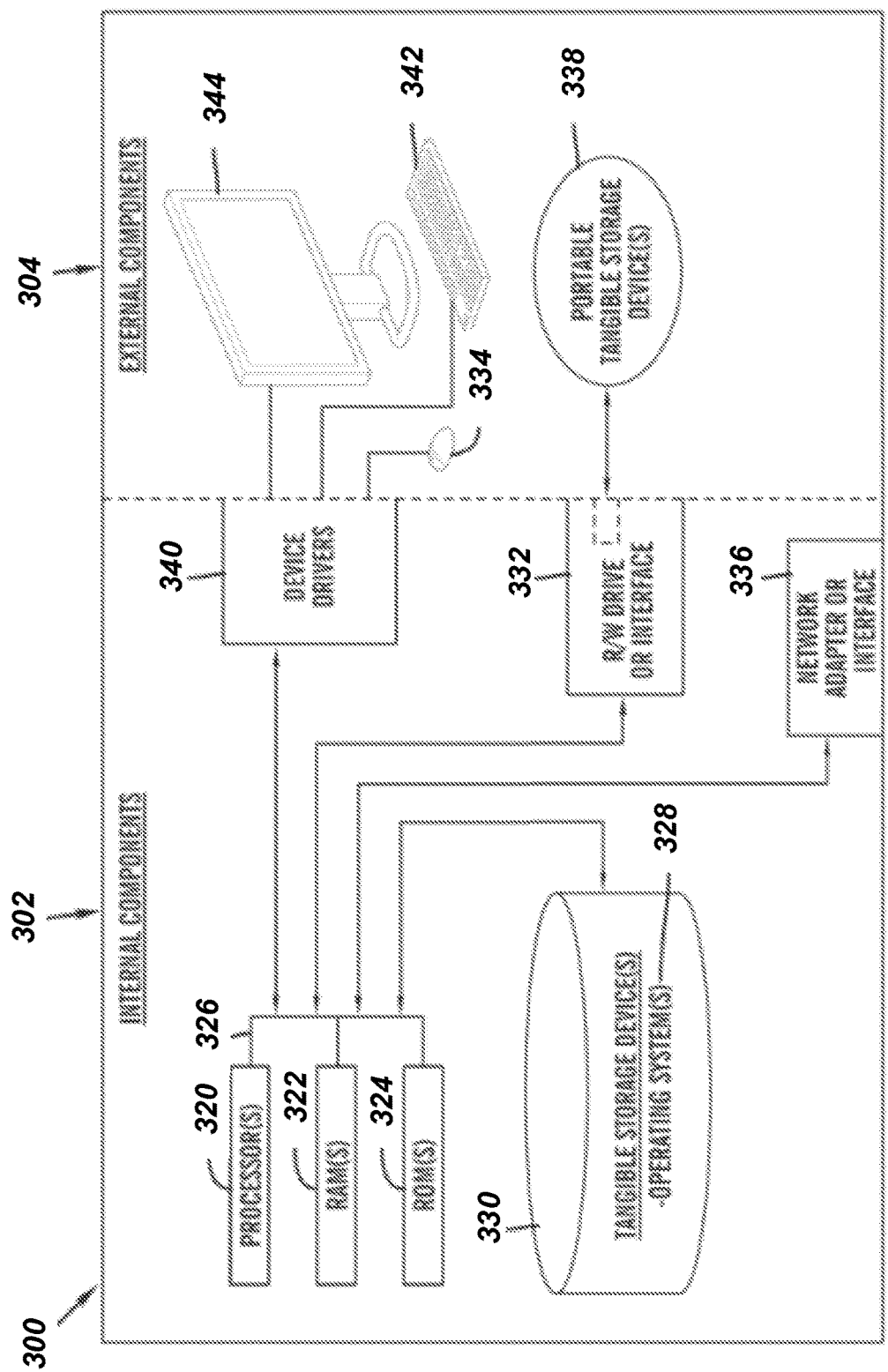
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 and external components 304 illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the high productivity moment detection program 110A in the client computing device 102 and the high productivity moment detection program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the high productivity moment detection program 110A, 110B, can be stored on one or more of the respective portable computer-readable tangible storage devices 338, read via the respective R/W drive or interface 332, and loaded into the respective hard drive 330.

Each set of internal components 302 also includes network adapters or interfaces 336 such as a TCP/IP adapter cards, wireless Wi-Fi interface cards, or 3G or 4G wireless interface cards or other wired or wireless communication links. The software program 108 and the high productivity moment detection program 110A in the client computing device 102 and the high productivity moment detection program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the high productivity moment detection program 110A in the client computing device 102 and the high productivity moment detection program 110B in the server 112 are loaded into the respective hard drive 330. The network may comprise copper wires, optical fibers, wireless transmission, routers, firewalls, switches, gateway computers and/or edge servers.

Each of the sets of external components 304 can include a computer display monitor 344, a keyboard 342, and a computer mouse 334. External components 304 can also include touch screens, virtual keyboards, touch pads, pointing devices, and other human interface devices. Each of the sets of internal components 302 also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
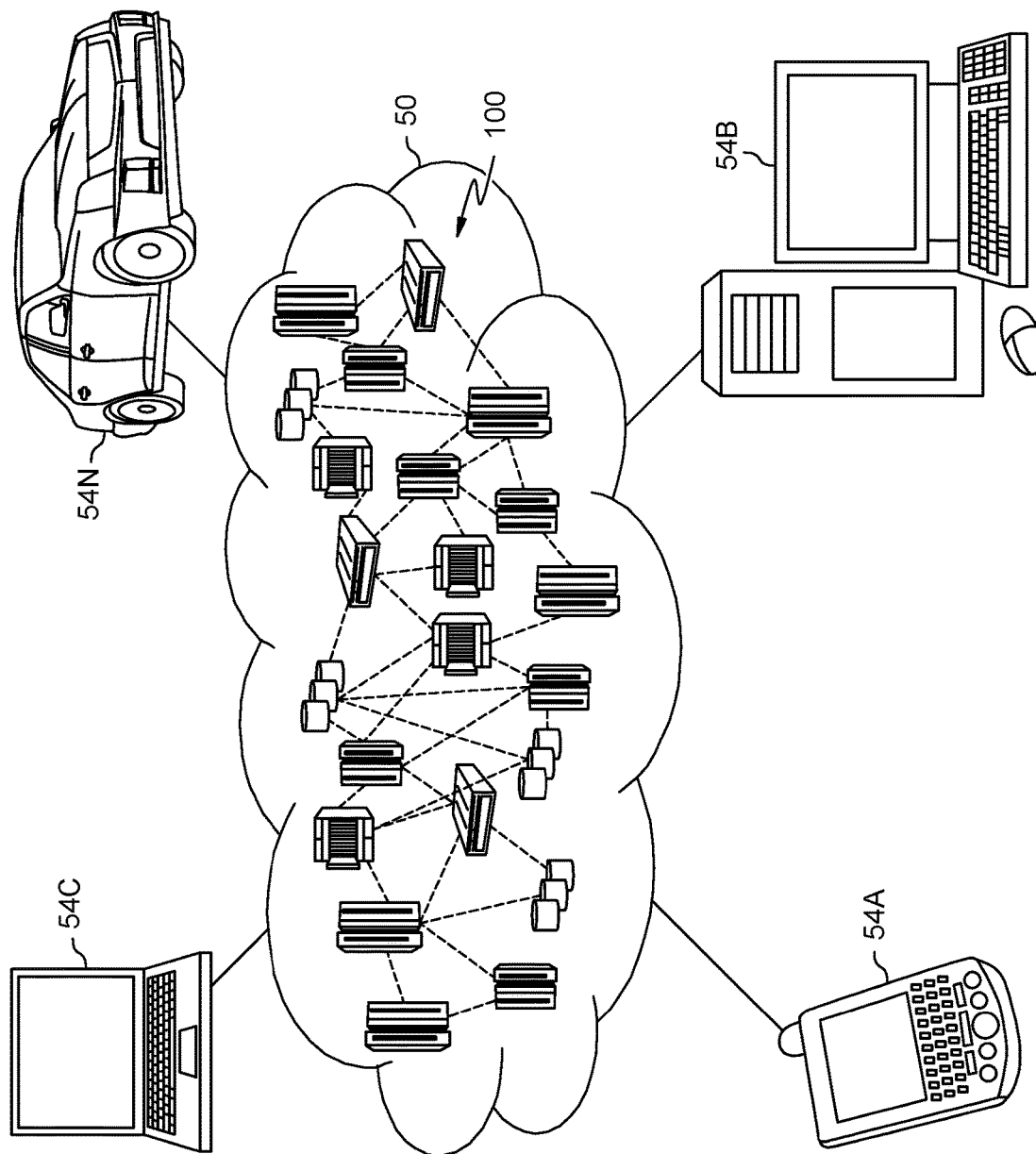
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
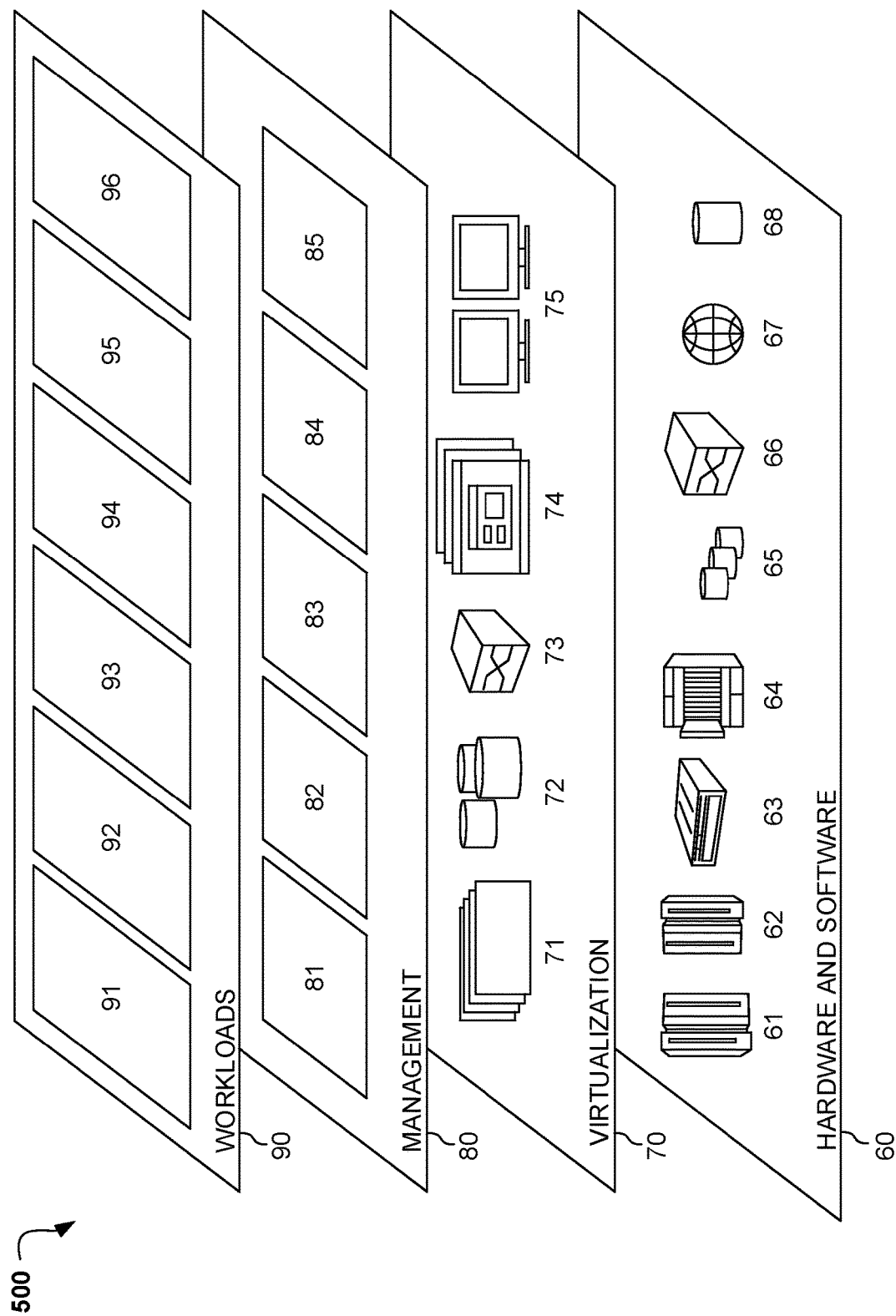
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and high productivity moment detection 96. High productivity moment detection 96 may relate calculating a productivity score from captured user metadata to identify periods of high user productivity and modifying notifications appropriately to ensure the user maximizes high productivity times.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for reducing one or more distractions during a period of high productivity, the method comprising:
   receiving, by a processor, a plurality of user metadata;
   in response to determining a user is in a high productivity state, analyzing the plurality of received user metadata for potential distractions to the high productivity state;
   in response to identifying one or more potential distractions based on the plurality of analyzed user metadata, determining an appropriate modification to the one or more identified potential distractions; and
   performing the determined appropriate modification, wherein the appropriate modification is based on a comparison of a usefulness of the identified potential distraction to the user and an amount of distraction of the identified potential distraction to the user.

2. The method of claim 1, wherein the plurality of user metadata is selected from a group consisting of a current open software application, a successful completion of one or more scheduled tasks, a plurality of calendar details, a chat history, a user typing speed, a user heart rate, a user perspiration level, a user blood pressure, one or more user facial expressions, a user pupil dilation level, a user focus direction, and one or more user hand movements.

3. The method of claim 1, wherein determining the user is in a high productivity state further comprises:
   calculating a productivity score relative to a user baseline using a weighted sum of a plurality of concentration measures, wherein the plurality of concentration measures assign a positive score to items that indicate a higher than average productivity and assign a negative score to items that indicate a lower than average productivity.

4. The method of claim 3, wherein the user baseline productivity state is calculated based on an initial batch of user metadata.

5. The method of claim 3, wherein the plurality of concentration measures to which a positive score is assigned are selected from a group consisting of a plurality of well written source code identified through a code analysis tool, a plurality of functional and sample tests for a plurality of new code are successful, and a plurality of recent window focus data, and wherein the plurality of concentration measures to which a negative score is assigned are selected from a group consisting of a low quantity of lines of code produced, a slow consistency rate of work produced, a plurality of historical productivity data, a plurality of historical schedule data, a plurality of hormonal physiological effects, a plurality of brain physiological effects, a plurality of recent device focus data, a plurality of track micro/macro-expressions, a plurality of general health data, and a current noise level.

6. The method of claim 1, wherein the appropriate modification is selected from a group consisting of reducing a volume level of a sound notification, shifting a notification or window to a side of a graphical user interface, selecting and displaying only a plurality of useful information from a message, preventing a noise from playing until a later time, preventing a notification from executing until a later time, automatically setting a user status to away, and rescheduling a meeting to a later time.

7. A computer system for reducing one or more distractions during a period of high productivity, the computer system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
   receiving a plurality of user metadata;
   in response to determining a user is in a high productivity state, analyzing the plurality of received user metadata for potential distractions to the high productivity state;
   in response to identifying one or more potential distractions based on the plurality of analyzed user metadata, determining an appropriate modification to the one or more identified potential distractions; and
   performing the determined appropriate modification, wherein the appropriate modification is based on a comparison of a usefulness of the identified potential distraction to the user and an amount of distraction of the identified potential distraction to the user.

8. The computer system of claim 7, wherein the plurality of user metadata is selected from a group consisting of a current open software application, a successful completion of one or more scheduled tasks, a plurality of calendar details, a chat history, a user typing speed, a user heart rate, a user perspiration level, a user blood pressure, one or more user facial expressions, a user pupil dilation level, a user focus direction, and one or more user hand movements.

9. The computer system of claim 7, wherein determining the user is in a high productivity state further comprises:
   calculating a productivity score relative to a user baseline using a weighted sum of a plurality of concentration measures, wherein the plurality of concentration measures assign a positive score to items that indicate a higher than average productivity and assign a negative score to items that indicate a lower than average productivity.

10. The computer system of claim 9, wherein the user baseline productivity state is calculated based on an initial batch of user metadata.

11. The computer system of claim 9, wherein the plurality of concentration measures to which a positive score is assigned are selected from a group consisting of a plurality of well written source code identified through a code analysis tool, a plurality of functional and sample tests for a plurality of new code are successful, and a plurality of recent window focus data, and wherein the plurality of concentration measures to which a negative score is assigned are selected from a group consisting of a low quantity of lines of code produced, a slow consistency rate of work produced, a plurality of historical productivity data, a plurality of historical schedule data, a plurality of hormonal physiological effects, a plurality of brain physiological effects, a plurality of recent device focus data, a plurality of track micro/macro-expressions, a plurality of general health data, and a current noise level.

12. The computer system of claim 7, wherein the appropriate modification is selected from a group consisting of reducing a volume level of a sound notification, shifting a notification or window to a side of a graphical user interface, selecting and displaying only a plurality of useful information from a message, preventing a noise from playing until a later time, preventing a notification from executing until a later time, automatically setting a user status to away, and rescheduling a meeting to a later time.

13. A computer program product for reducing one or more distractions during a period of high productivity, the computer program product comprising:
one or more computer-readable tangible storage media and program instructions stored on at least one of the one or more tangible storage media, the program instructions executable by a processor of a computer to perform a method, the method comprising:
receiving a plurality of user metadata;
in response to determining a user is in a high productivity state, analyzing the plurality of received user metadata for potential distractions to the high productivity state;
in response to identifying one or more potential distractions based on the plurality of analyzed user metadata, determining an appropriate modification to the one or more identified potential distractions; and
performing the determined appropriate modification, wherein the appropriate modification is based on a comparison of a usefulness of the identified potential distraction to the user and an amount of distraction of the identified potential distraction to the user.

14. The computer program product of claim 13, wherein the plurality of user metadata is selected from a group consisting of a current open software application, a successful completion of one or more scheduled tasks, a plurality of calendar details, a chat history, a user typing speed, a user heart rate, a user perspiration level, a user blood pressure, one or more user facial expressions, a user pupil dilation level, a user focus direction, and one or more user hand movements.

15. The computer program product of claim 13, wherein determining the user is in a high productivity state further comprises:
calculating a productivity score relative to a user baseline using a weighted sum of a plurality of concentration measures, wherein the plurality of concentration measures assign a positive score to items that indicate a higher than average productivity and assign a negative score to items that indicate a lower than average productivity.

16. The computer program product of claim 15, wherein the user baseline productivity state is calculated based on an initial batch of user metadata.

17. The computer program product of claim 15, wherein the plurality of concentration measures to which a positive score is assigned are selected from a group consisting of a plurality of well written source code identified through a code analysis tool, a plurality of functional and sample tests for a plurality of new code are successful, and a plurality of recent window focus data, and wherein the plurality of concentration measures to which a negative score is assigned are selected from a group consisting of a low quantity of lines of code produced, a slow consistency rate of work produced, a plurality of historical productivity data, a plurality of historical schedule data, a plurality of hormonal physiological effects, a plurality of brain physiological effects, a plurality of recent device focus data, a plurality of track micro/macro-expressions, a plurality of general health data, and a current noise level.

* * * * *